US011205001B2

(12) United States Patent
Geng

(10) Patent No.: US 11,205,001 B2
(45) Date of Patent: Dec. 21, 2021

(54) VIRUS PROGRAM CLEANUP METHOD, STORAGE MEDIUM AND ELECTRONIC TERMINAL

(71) Applicant: TENCENT TECHNOLOGY (SHENZHEN) COMPANY LIMITED, Guangdong (CN)

(72) Inventor: Chen Geng, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 295 days.

(21) Appl. No.: 16/518,384

(22) Filed: Jul. 22, 2019

(65) Prior Publication Data
US 2019/0347419 A1 Nov. 14, 2019

Related U.S. Application Data

(63) Continuation of application No. PCT/CN2018/079135, filed on Mar. 15, 2018.

(30) Foreign Application Priority Data

May 3, 2017 (CN) .......................... 201710305435.0

(51) Int. Cl.
*G06F 21/56* (2013.01)
*G06F 21/54* (2013.01)
*H04L 9/32* (2006.01)

(52) U.S. Cl.
CPC ............ *G06F 21/568* (2013.01); *G06F 21/54* (2013.01); *G06F 21/561* (2013.01); *H04L 9/3239* (2013.01)

(58) Field of Classification Search
CPC ...... G06F 21/568; G06F 21/54; G06F 21/561; G06F 21/566; H04L 9/3239; H04L 9/3234
See application file for complete search history.

(56) References Cited

U.S. PATENT DOCUMENTS

2011/0093953 A1* 4/2011 Kishore ................. G06F 21/56
726/24
2012/0036572 A1 2/2012 Yoo
(Continued)

FOREIGN PATENT DOCUMENTS

| CN | 104091120 A | 10/2014 |
| CN | 104462969 A | 3/2015 |

(Continued)

OTHER PUBLICATIONS

International Preliminary Report on Patentability with a Translation of Written Opinion in International English Application No. PCT/CN2018/079135, dated Nov. 5, 2019.
(Continued)

*Primary Examiner* — Jung W Kim
*Assistant Examiner* — Sangseok Park
(74) *Attorney, Agent, or Firm* — Sughrue Mion, PLLC

(57) ABSTRACT

A method of cleaning up a virus program, in an electronic terminal including at least one processor, is provided. An operable interface is displayed on a terminal locked page in response to a first operation instruction on the terminal locked page, the terminal locked page being a page of the virus program and displayed on a screen of the electronic terminal. A second operation instruction on the operable interface is obtained, and identifier information of the virus program is obtained in response to the second operation instruction. The virus program is controlled to run by displaying an auxiliary page on the screen of the electronic terminal in a bring-to-front manner. The virus program is cleaned up based on the identifier information.

20 Claims, 10 Drawing Sheets

(56) References Cited

U.S. PATENT DOCUMENTS

| | | | |
|---|---|---|---|
| 2013/0007883 A1* | 1/2013 | Zaitsev | G06F 21/561 |
| | | | 726/24 |
| 2013/0014262 A1 | 1/2013 | Lee et al. | |
| 2014/0068776 A1* | 3/2014 | Xiao | G06F 21/561 |
| | | | 726/24 |

FOREIGN PATENT DOCUMENTS

| | | |
|---|---|---|
| CN | 105095757 A | 11/2015 |
| CN | 105095758 A | 11/2015 |

OTHER PUBLICATIONS

International Search Report for PCT/CN2018/079135 dated Jun. 5, 2018 [PCT/ISA/210].

* cited by examiner

VIRUS PROGRAM CLEANUP METHOD, STORAGE MEDIUM AND ELECTRONIC TERMINAL

CROSS-REFERENCE TO RELATED APPLICATION(S)

This application is a continuation application of International Application No. PCT/CN2018/079135, which claims priority to China Patent Application No. 201710305435.0, filed with the Chinese Patent Office on May 3, 2017 and entitled "VIRUS PROGRAM CLEANUP METHOD, STORAGE DEVICE AND ELECTRONIC TERMINAL", the disclosures of which are herein incorporated by reference in their entireties.

BACKGROUND

1. Field

The disclosure relates to the field of information security technologies, and in particular, to a virus program cleanup method, a storage medium, and an electronic terminal.

2. Description of the Related Art

As a new type of a virus program, the screen locking ransomware Trojan becomes increasingly rampant in recent years, and a main attack principle thereof is as follows. After hacking into an electronic terminal installed with an Android system, the screen locking ransomware Trojan locks the electronic terminal, so that a victim user cannot unlock the electronic terminal in a normal unlocking manner. Because the screen locking ransomware Trojan is mainly intended to ask for ransom money, it severely affects normal use of the electronic terminal by the user before the ransom money is paid, and causes great property loss to the user. Therefore, how to cleanup a virus program such as the screen locking ransomware Trojan becomes a focus of persons skilled in the art.

SUMMARY

One or more example embodiments provide a method of cleaning up a virus program, a computer storage medium and an electronic terminal, that are applicable in a wide range and universal, and may clean up a virus program such as screen locking ransomware Trojan more quickly and conveniently, thereby improving processing performance of a processor of an electronic terminal.

According to an aspect of an example embodiment, provided is a method of cleaning up a virus program, in an electronic terminal including at least one processor, is provided. A first operation instruction for an input field included in a terminal locked page of the electronic terminal is obtained, and an operable interface on the terminal locked page is displayed in response to the first operation instruction. The terminal locked page is a page of the virus program and displayed on a screen of the electronic terminal in a bring-to-front manner. The operable interface includes an item for cleaning up the virus program. A second operation instruction with respect to the item for cleaning up the virus program on the operable interface is obtained, and identifier information of the virus program is obtained in response to the second operation instruction. An auxiliary page is displayed on the screen of the electronic terminal in the bring-to-front manner, so that the virus program is switched to run in the background. The virus program is cleaned up based on the identifier information.

According to an aspect of another example embodiment, provided is a non-transitory computer readable storage medium, storing machine readable instructions executable by at least one processor to perform: obtaining a first operation instruction for an input field included in a terminal locked page of an electronic terminal, and displaying an operable interface on the terminal locked page in response to the first operation instruction, the terminal locked page being a page of a virus program and displayed on a screen of the electronic terminal in a bring-to-front manner, and the operable interface including an item for cleaning up the virus program; obtaining a second operation instruction with respect to the item for cleaning up the virus program on the operable interface, and obtaining identifier information of the virus program in response to the second operation instruction; displaying an auxiliary page on the screen of the electronic terminal in the bring-to-front manner, so that the virus program is switched to run in the background; and cleaning up the virus program based on the identifier information.

According to an aspect of still another example embodiment, provided is an electronic terminal, including: at least one memory operable to store program code; and at least one processor operable to read the program code and operate as instructed by the program code. The program code includes: first obtaining code configured to cause at least one of the at least one processor to obtain a first operation instruction for an input field included in a terminal locked page of the electronic terminal, and display an operable interface on the terminal locked page in response to the first operation instruction, the terminal locked page being a page of the virus program and displayed on a screen of the electronic terminal in a bring-to-front manner, and the operable interface including an item for cleaning up the virus program; second obtaining code configured to cause at least one of the at least one processor to obtain a second operation instruction with respect to the item for cleaning up the virus program on the operable interface, and obtain identifier information of the virus program in response to the second operation instruction; displaying code configured to cause at least one of the at least one processor to display an auxiliary page on the screen of the electronic terminal in the bring-to-front manner, so that the virus program is switched to run in the background; and cleaning code configured to cause at least one of the at least one processor to clean up the virus program based on the identifier information.

BRIEF DESCRIPTION OF THE DRAWINGS

These and/or other aspects will become apparent and more readily appreciated from the following description of the embodiments, taken in conjunction with the accompanying drawing. Apparently, the accompanying drawings in the following description show some embodiments, and persons of ordinary skill in the art may still derive other drawings from these accompanying drawings without creative efforts.

DETAILED DESCRIPTION

To make the objectives, technical solutions and advantages of the disclosure clearer, the following describes the disclosure in further detail with reference to the accompanying drawings and example embodiments.

Some terms and implementation scenarios related to example embodiments of the disclosure are introduced briefly first.

A virus program refers to a set of computer instructions or program code that can destroy functions or data of a computer. For example, a screen locking ransomware Trojan that can lock an electronic terminal is an example of a virus program.

The terms "a module" and/or "a unit" used in the disclosure are for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

Figure 1:
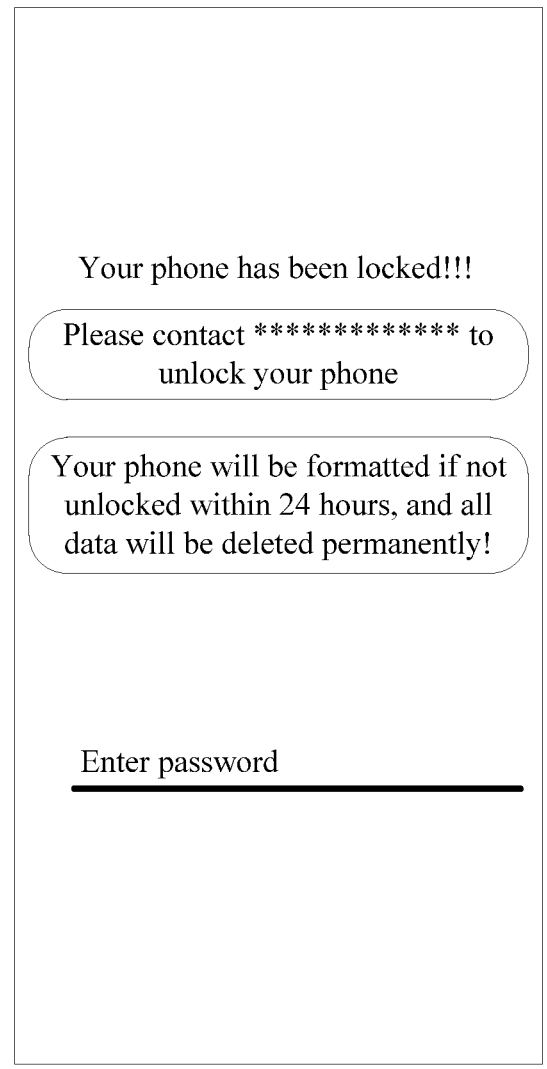
FIG. 1 is a schematic diagram of an interface of a terminal according to an embodiment.

FIG. 1 is a schematic diagram of a display interface of an electronic terminal that is installed with an Android system and hacked by a screen locking ransomware Trojan. Because the screen locking ransomware Trojan is mainly intended to ask for money, a contact method is left on a terminal locked page as shown in FIG. 1. After a victim user transfers money to a malicious user based on the contact method and obtains an unlocking password from the malicious user, the victim user inputs the unlocking password in an "Enter password" box displayed on the terminal locked page in FIG. 1, and then can unlock the electronic terminal.

Currently, a virus program such as the screen locking ransomware Trojan is cleaned up by using the following two methods. In the first method, the electronic terminal automatically cleans up all of locally stored data in a security mode, that is, the screen locking ransomware Trojan is cleaned up by means of factory resetting. In the second method, the electronic terminal is connected, through a data cable, to a computer installed with a security management application, and then the computer runs a screen locking virus killer provided by the security management application, to kill the screen locking ransomware Trojan by using the screen locking virus killer. In the second method, the electronic terminal further needs to enable a Universal Serial Bus (USB) debugging mode and grant a debugging authorization to the computer.

In the first method, because user data of the victim user is also cleaned up during cleanup of the screen locking ransomware Trojan, normal use of the electronic terminal by the user is severely affected. In the second method, because the electronic terminal needs to enable a USB debugging mode and grant a debugging authorization to the computer, if the screen locking ransomware Trojan stops the electronic terminal from enabling the USB debugging mode and stops the electronic terminal from granting a debugging authorization to the computer when the electronic terminal is connected to the computer, the computer cannot clean up the screen locking ransomware Trojan. Therefore, this cleanup method has limited applicability and lacks universality.

In response to detecting a virus program such as the screen locking ransomware Trojan, to prevent the Trojan from causing property loss to the victim user and affecting normal use of the electronic terminal by the user, in addition to the two processing methods above, real-time defense detection may also be performed by using security management application after the electronic terminal such as a mobile phone downloads the screen locking ransomware Trojan. In the real-time defense detection, when the security management application detects, based on virus program data recorded in an antivirus database, that the electronic terminal has just downloaded the screen locking ransomware Trojan, the security management application automatically prompts the victim user that there is a screen locking ransomware Trojan on the electronic terminal, and prompts the user to clean up the Trojan.

Such a proactive prevention method may not avoid severe defects to the electronic terminal in some cases. That is, the above method is effective only when the victim user does not trigger the screen locking ransomware Trojan to run, and in this case, the victim user is prompted to kill the screen locking ransomware Trojan that is not run yet. In situations where, for example, the screen locking ransomware Trojan has changed or if the screen locking ransomware Trojan is not recorded in the security management application yet, the security management application does not provide a prompt. In this case, if the screen locking ransomware Trojan is triggered by the victim user to run, the screen locking ransomware Trojan locks the electronic terminal; as a result, the electronic terminal cannot be used normally, and the security management application cannot solve this problem.

As shown in FIG. 1, when the screen locking ransomware Trojan is run on the electronic terminal, the only operable application program available to the victim user is an input method, because after obtaining an unlocking password by transferring money to the malicious user, the victim user further needs to input, through an operable interface such as an input method interface provided by the input method, the password in an "Enter password" input box (or input field) shown in FIG. 1, thereby unlocking the electronic terminal. In the example embodiments, the screen locking ransomware Trojan is cleaned up based on a particular input method program, thereby unlocking the electronic terminal. The virus program cleanup method according to example embodiments does not have problems or disadvantages in the related art methods described above, does not affect normal use of the electronic terminal by the user, is applicable in a wide range and universal, and can clean up a virus program such as the screen locking ransomware Trojan, thereby improving processing performance of the electronic terminal.

It should be noted that, in addition to the virus program, for any other application programs that may lock an electronic terminal, the electronic terminal can be unlocked provided that the locked electronic terminal can start the foregoing input method program provided in the embodiments.

Figure 2:
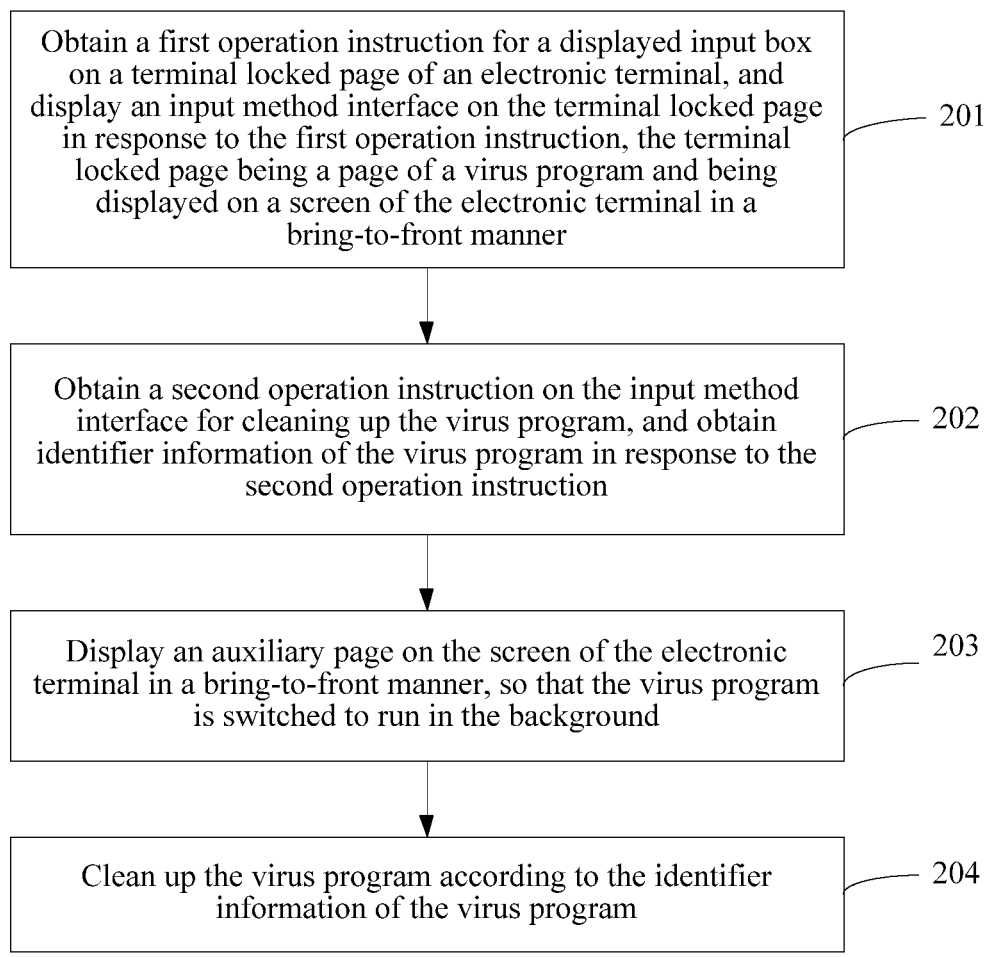
FIG. 2 is a flowchart of a virus program cleanup method according to an embodiment.

FIG. 2 is a flowchart of a virus program cleanup method according to an embodiment. This method is applicable to a computing device, such as an electronic terminal and a server. In this embodiment, a computing device is an electronic terminal, an operable interface is an input method interface, and a virus program is a screen locking ransomware Trojan is used as an example. Referring to FIG. 2, a process of a method provided in this embodiment includes operations 201-204:

Operation 201. Obtain a first operation instruction for a displayed input box on a terminal locked page of an electronic terminal, and display an operable interface on the terminal locked page in response to the first operation instruction, the terminal locked page being a page of a virus program and being displayed on a screen of the electronic terminal in a bring-to-front manner.

Figure 3A:
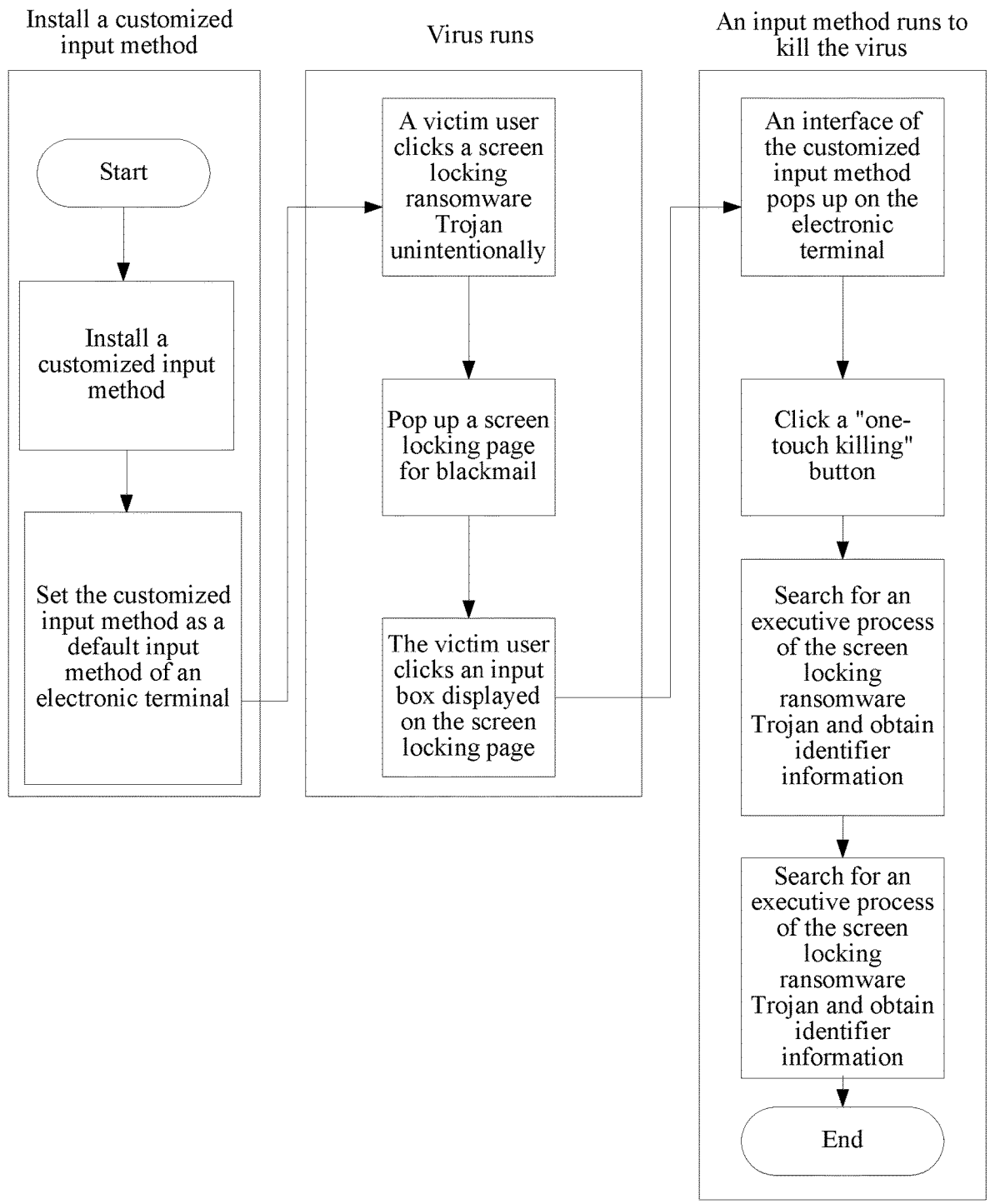
FIG. 3a is an overall flowchart related to a virus program cleanup method according to an embodiment.

In this embodiment, with reference to a virus running process shown in FIG. 3a, when a screen locking ransomware Trojan is downloaded on the electronic terminal, if a victim user performs some operations unconsciously, for example, if the victim user clicks an icon, a link, or the like faked by the screen locking ransomware Trojan, the screen locking ransomware Trojan starts to run. In such a case, because the screen locking ransomware Trojan attacks the electronic terminal, the electronic terminal may display, in a bring-to-front manner, a terminal locked page shown in FIG. 1. That is, the terminal locked page of the screen locking ransomware Trojan is displayed in front of all other pages on the screen of the electronic terminal in a bring-to-front manner similar to a display manner of a desktop floating window. In other words, no matter which page is displayed on the screen of the electronic terminal previously, after the screen locking ransomware Trojan starts running, the terminal locked page occupies the full screen of the electronic terminal, and is displayed in front of any other page.

In this case, except clicking an "Enter password" input box (or input field) on the terminal locked page to attempt to input an unlocking password, the victim user cannot operate the electronic terminal normally, for example, unlocking and using the electronic terminal through normal operations. In such a case, to enable the electronic terminal to be used normally again, this embodiment provides a virus program cleanup method to clean up the screen locking ransomware Trojan.

During cleanup of a virus program such as the screen locking ransomware Trojan, this embodiment is based on a customized input method. Therefore, in this embodiment, as shown in FIG. 3a, the customized input method is installed first. The customized input method is compiled by a developer according to input method framework requirements of the Android system. In addition to a basic input function, the customized input method can also respond to an operation instruction for cleaning up the screen locking ransomware Trojan, thereby assisting the electronic terminal in searching for the screen locking ransomware Trojan, terminating an executive process of the screen locking ransomware Trojan, uninstalling the screen locking ransomware Trojan, and other processes.

In addition, to ensure that the customized input method can be invoked prior to other input methods when the victim user performs an input operation in the "Enter password" input box shown in FIG. 1, as shown in FIG. 3a, the customized input method is set as a default input method of the system. In this way, after the customized input method is invoked, the electronic terminal can start, based on the customized input method, the process of cleaning up the screen locking ransomware Trojan.

In this embodiment, setting of the default input method can be completed on a setting page. Specifically, all current electronic terminals provide an input method entry on a setting page. After obtaining a click operation on the input method entry, the electronic terminal displays a menu page about the input method. The menu page includes an option for setting a default input method. After further obtaining a click operation on the option by the user, the electronic terminal synchronously displays a list of all input methods already installed. When the electronic terminal obtains a click operation of the user on the customized input method in the list, the customized input method can be determined as the default input method. It should be noted that, to help the user quickly determine the specific input method in all the input methods installed, a piece of prompt information may be displayed in a peripheral area of the specific input method in the list, to prompt the user that the specific input method has a function of assisting in cleaning up the screen locking ransomware Trojan. The prompt information may be text information such as "assisting in cleaning up the screen locking ransomware Trojan", and is not limited in this embodiment.

Figure 4:
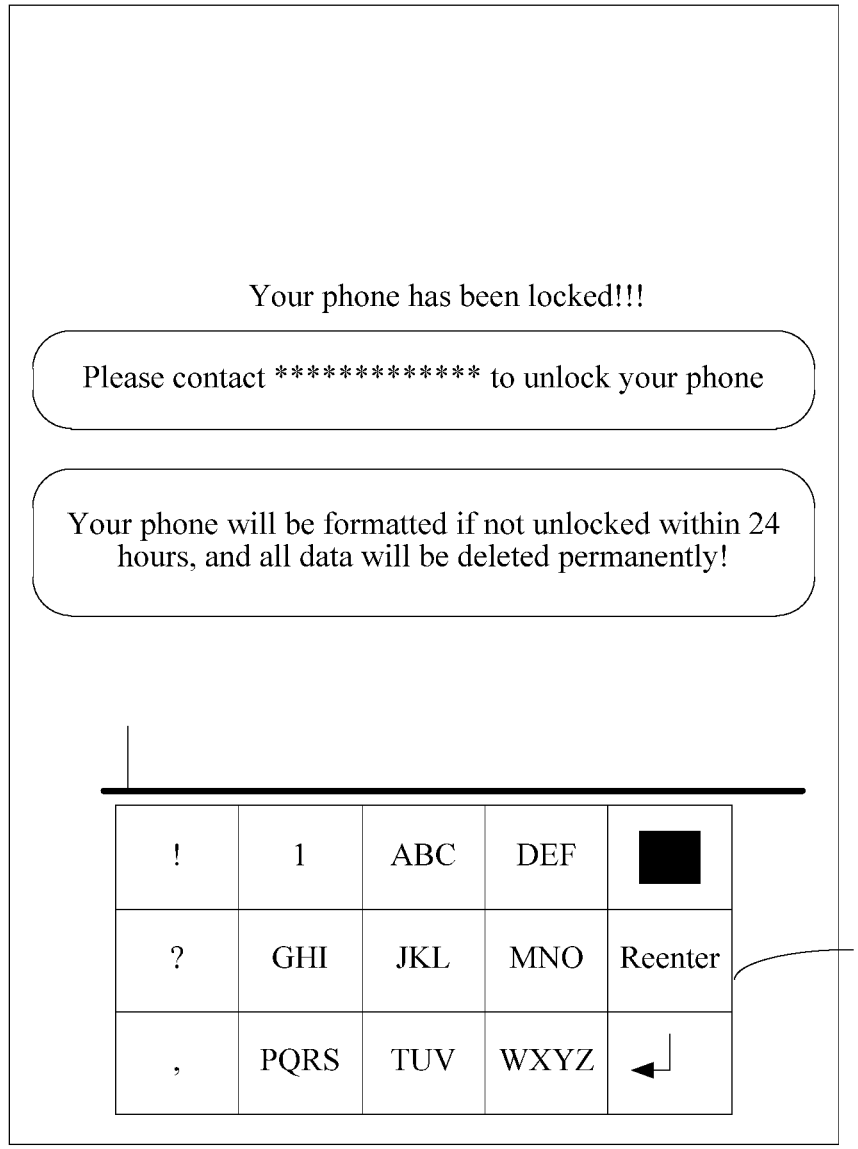
FIG. 4 is a schematic diagram of an interface of a terminal according to an embodiment.

In this embodiment, the terminal locked page is as shown in FIG. 1. The terminal locked page generated by the screen locking ransomware Trojan is used for reminding the victim user to transfer money to unlock the electronic terminal. Therefore, to achieve an absolute expressing function, the terminal locked page is displayed on the screen of the electronic terminal in a bring-to-front manner. The input box (or an input field) refers to a box (or a field) for inputting an unlocking password in FIG. 1, e.g., the "Enter password" input box shown in FIG. 1. After the victim user performs a click operation on the input box, the electronic terminal determines that a first operation instruction for the input box is obtained, and then displays, on the terminal locked page shown in FIG. 1, an input method interface of the customized input method (that is, the default input method of the system), as shown in 401 in FIG. 4, in response to the first operation instruction.

Operation 202. Obtain a second operation instruction on the input method interface for cleaning up the virus program, and obtain identifier information of the virus program in response to the second operation instruction.

After the electronic terminal invokes the customized input method through operation 201, the cleanup process for the screen locking ransomware Trojan can be started in the following manners.

In the first manner, the electronic terminal starts the cleanup process for the screen locking ransomware Trojan after obtaining a second operation instruction for a virus cleanup button displayed on an input method interface of the customized input method.

Figure 5:
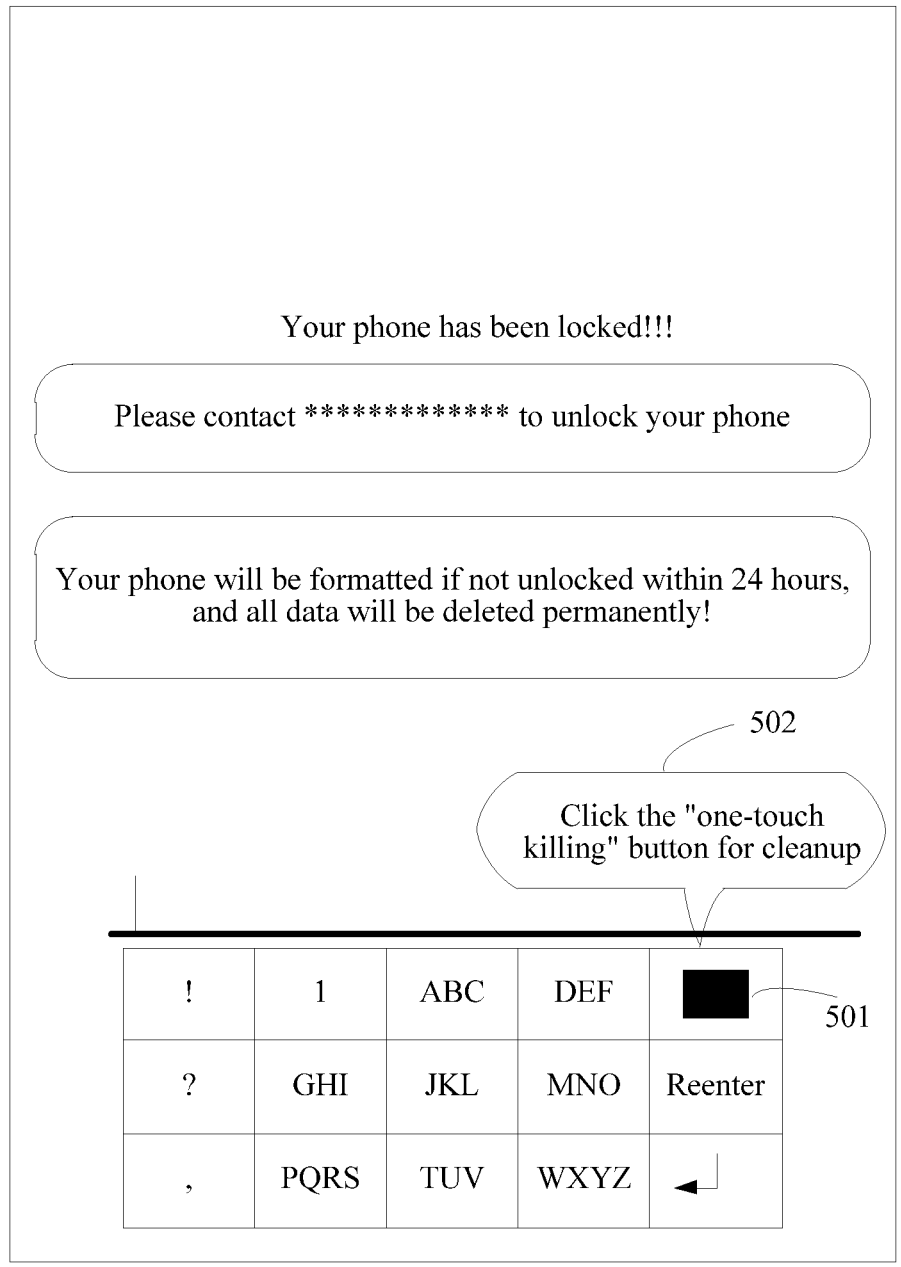
FIG. 5 is a schematic diagram of an interface of a terminal according to an embodiment.

In the first manner, as shown in FIG. 5, a selectable item 501 for cleaning up the virus program (e.g., a virus cleanup button) as shown in in FIG. 5 is set on the input method interface of the customized input method. To enable a victim user unfamiliar with the function of the virus cleanup button to quickly start the cleanup process for the screen locking ransomware Trojan, in this embodiment, as shown in FIG. 5, a prompt message 502 such as "click the one-touch killing button for cleanup" may further be displayed on the periphery of a display area of the virus cleanup button 501 (which is referred to as a "one-touch killing" button in FIG. 5), so as to prompt the victim user. After the electronic terminal obtains a click operation of the victim user on the virus cleanup button 501, the electronic terminal determines that a second operation instruction for the virus cleanup button 501 is received, and then starts the cleanup process for the screen locking ransomware Trojan in response to the second operation instruction.

In the second manner, the electronic terminal displays, on the input method interface of the customized input method, first prompt information for shaking the terminal, and starts the cleanup process for the screen locking ransomware Trojan after obtaining a terminal shaking operation.

Figure 6:
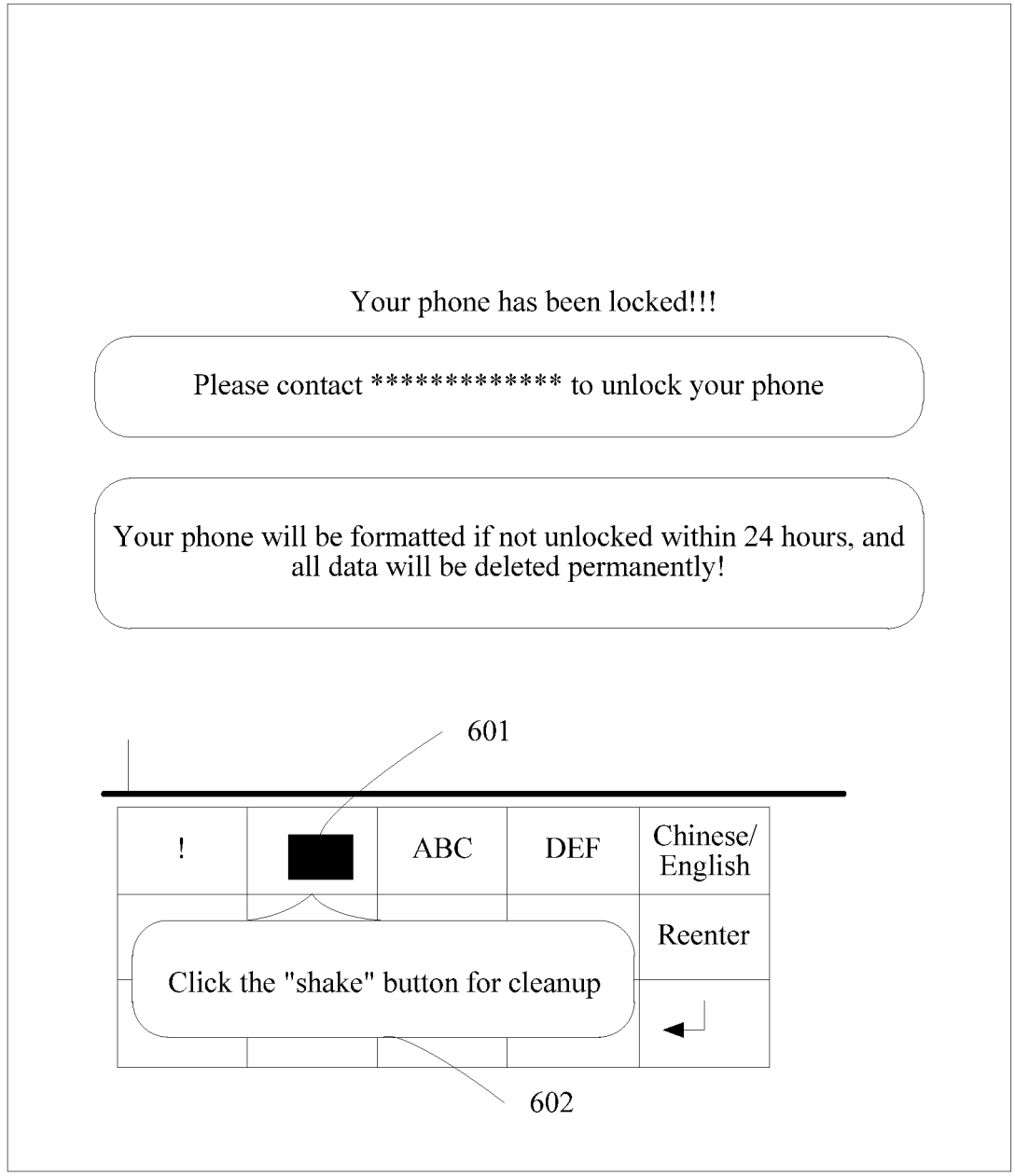
FIG. 6 is a schematic diagram of an interface of a terminal according to an embodiment.

In the second manner, in this embodiment, the cleanup process for the screen locking ransomware Trojan is started through a shake function, instead of by setting a virus cleanup button on the input method interface of the customized input method. As shown in FIG. 6, a selectable item 601 for cleaning up the virus program (e.g., a shake button) for entering a shake function page may be displayed on the input method interface. After clicking the shake button 601 according to a first prompt message 602, the victim user can shake the electronic terminal. After obtaining such a terminal shaking operation, the electronic terminal generates a second operation instruction, and then starts a cleanup process for the screen locking ransomware Trojan in response to the second operation instruction.

In the third manner, the electronic terminal displays, on the input method interface of the customized input method, second prompt information for inputting a particular gesture pattern, and starts the cleanup process for the screen locking ransomware Trojan after determining that a gesture pattern currently input on the input method interface matches the pre-stored particular gesture pattern.

Figure 7:
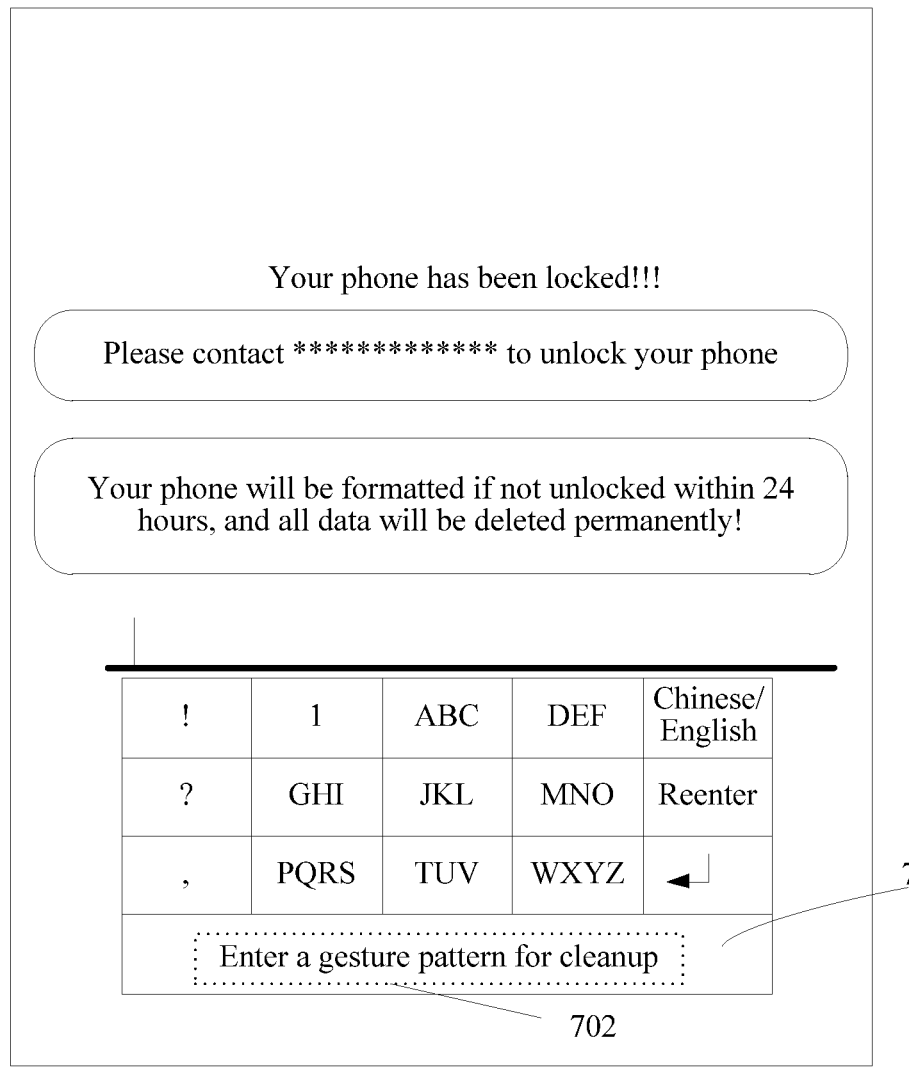
FIG. 7 is a schematic diagram of an interface of a terminal according to an embodiment.

In the third manner, in this embodiment, as shown in FIG. 7, an item (or area) 701 for allowing a victim user to input a gesture pattern may be provided on the input method interface. To guide the victim user to clean up the screen locking ransomware Trojan, the electronic terminal may further display, in this area, second prompt information 702 such as "inputting a gesture pattern for cleanup". After determining that the gesture pattern currently input on the input method interface matches the pre-stored particular gesture pattern, the electronic terminal generates a second operation instruction, and then starts the cleanup process for the screen locking ransomware Trojan in response to the second operation instruction.

In another embodiment, the particular gesture pattern may be set after the electronic terminal sets the specific input method as the default input method. For example, after the default input method is set, a prompt message for setting the particular gesture pattern pops up on the electronic terminal. After the electronic terminal obtains a setting confirm operation of the user, then a setting page for the particular gesture pattern then pops up. After that, the electronic terminal obtains and records, in real time, slide operations appearing on the setting page, combines the recorded slide operations into the particular gesture pattern, and stores the particular gesture pattern.

Figure 8:
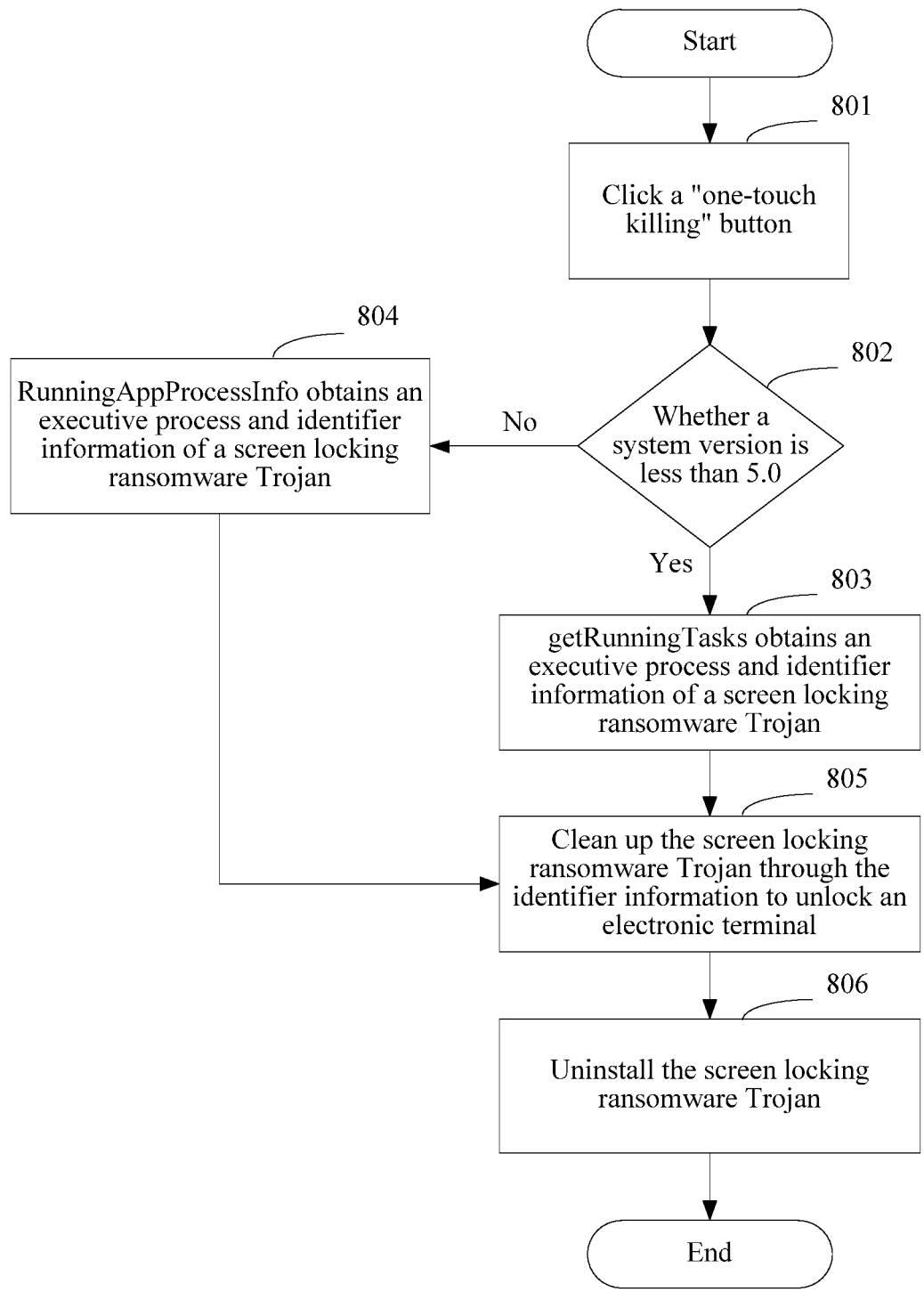
FIG. 8 is an execution flowchart related to a virus program cleanup method according to an embodiment.

In conclusion, after obtaining the second operation instruction for cleaning up the screen locking ransomware Trojan, the electronic terminal specifically responds to the second operation instruction by starting the cleanup process for the screen locking ransomware Trojan. The cleanup process for the screen locking ransomware Trojan may be as shown in FIG. 8. In FIG. 8, starting the cleanup process for the screen locking ransomware Trojan by clicking a "one-touch killing" button is used as an example for description. The first operation of cleaning up the screen locking ransomware Trojan is to obtain identifier information of the screen locking ransomware Trojan. In this embodiment, after operation 801 of clicking a "one-touch killing" button to start the cleanup process for the screen locking ransomware Trojan, the identifier information of the screen locking ransomware Trojan needs to be obtained first. The identifier information of the screen locking ransomware Trojan may be obtained in the following three manners, manner 1, manner 2, and manner 3:

In manner 1, if a version number of a currently installed operating system of the electronic terminal is less than a preset version number, a specified system interface provided by the operating system is invoked to obtain tasks currently in a running state, so as to obtain a task queue; a top-ranking task in the task queue is determined as an executive process of the screen locking ransomware Trojan, and profile information of the top-ranking task is determined as the identifier information of the screen locking ransomware Trojan.

The identifier information may be a package name of the screen locking ransomware Trojan or a process name of the executive process of the screen locking ransomware Trojan, and is not limited in this embodiment. In this embodiment, the preset version number may refer to version 5.0 of the operating system installed on the electronic terminal. In addition, it should be noted that, in an example of using an Android operating system, all interfaces mentioned in this embodiment are essentially methods provided by the Android operating system for developers.

As shown in FIG. 8, in operation 802, it is determined whether a version number of a currently installed operating system of the electronic terminal is less than a preset version number 5.0. In operation 803, if the version number of the currently installed operating system of the electronic terminal is less than 5.0, the electronic terminal invokes a specified system interface to obtain tasks currently in a running state. The specified system interface includes, but is not limited to, a getRunningTasks method, which is specifically used for obtaining tasks currently in a running state in the operating system and generating a task queue. By using the getRunningTasks method, a task running at the front of the screen of the electronic terminal is displayed in the front of the task queue. Because the terminal locked page of the screen locking ransomware Trojan is located at the front of the screen of the electronic terminal, the electronic terminal can directly determine the task in the front of the task queue as the executive process of the screen locking ransomware Trojan. It is assumed that the getRunningTasks method lists the following five tasks ranked in the front, and the five tasks are as follows:

com.sx.zz.MainActivity,
    com.lenovo.launcher.Launcher,
    com.android.settings.SubSettings,
    tencent.input.InputMethodSetting,
    com.lenovo.ideafriend.mms.android.ui.ComposeMessageActivity The task ranked in the first position among the five tasks is com.sx.zz.MainActivity; this task is the executive process of the screen locking ransomware Trojan, and com.sx.zz is the package name of the screen locking ransomware Trojan. That is, com.sx.zz is used as the identifier information of the screen locking ransomware Trojan.

In addition, profile information of all the foregoing tasks are named with package names, and may also be named with process numbers. This is not limited in this embodiment.

In manner 2, if a version number of a currently installed operating system of the electronic terminal is greater than a preset version number, at least one state variable value and at least one importance variable value stored by a specified method class provided by the operating system are obtained; and if a state variable value of a task currently in a running state is a first numerical value and an importance variable value of the task is a second numerical value, the task is determined as an executive process of the screen locking ransomware Trojan, and profile information of the task is determined as the identifier information of the screen locking ransomware Trojan.

In this case, as shown in FIG. 8, in operation 804, if the version number of the currently installed operating system of the electronic terminal is greater than 5.0, because the getRunningTasks method is disabled in an operating system with a version number greater than 5.0, an executive process of the screen locking ransomware Trojan further needs to be determined among the tasks currently in the running state through a specified method class provided by the operating system. The specified method class in this embodiment includes, but is not limited to, a RunningAppProcessInfo class. The RunningAppProcessInfo class is used for storing a state variable (processState) value and an importance variable (importance) value for each task currently in the running state. The state variable value is used for describing a state of the task, and the importance variable value is used for describing an importance level of the task. States of the task can be classified into uninterruptible sleep, interruptible sleep, high-priority level, low-priority level, foreground process group, session leader process, multithread process, and the like, which are not limited in this embodiment. In this embodiment, when a state variable value of a task is 2, it indicates that the task is in a foreground process group. Further, when the importance variable value of the task is 100, it indicates that the task has the highest importance level, and the task is a task displayed at the front of the screen of the electronic terminal.

Therefore, in this embodiment, by obtaining at least one state variable value and at least one importance variable value stored in the RunningAppProcessInfo class, the executive process of the screen locking ransomware Trojan is determined among all the tasks currently in the running state. By using the foregoing five tasks as an example, the state variable value and the importance variable value stored by the RunningAppProcessInfo class for each task in the running state may be as follows:

--- com.sx.zz processState:2 importance:100
com.lenovo.launcher.Launcher processState:0 importance:100
com.android.settings.SubSettings processState:4 importance:130
tencent.input.InputMethodSetting processState:0 importance:100
com.lenovo.ideafriend.mms.android.ui processState:0 importance:100

---

During presetting of the operating system, it is normally specified that when the value of processState is 2 and the value of importance is 100, it indicates that the task runs at the front of the screen of the electronic terminal. Based on this rule, the electronic terminal only needs to determine, in the foregoing five tasks, a task with a processState value of 2 and an importance value of 100, and this task is the executive process of the screen locking ransomware Trojan. That is, in this embodiment, the value of the first numerical value is 2, and the value of the second numerical value is 100. Because the task com.sx.zz has a processState value of 2 and an importance value of 100, com.sx.zz is directly used as the identifier information of the screen locking ransomware Trojan.

In manner 3, if a version number of a currently installed operating system of the electronic terminal is greater than a preset version number, a Message Digest Algorithm 5 (MD5) of each task currently in the running state is obtained; the MD5 value of each task currently in the running state is compared with a pre-stored MD5 value of the screen locking ransomware Trojan; and if an MD5 value of a task currently in the running state is consistent with the MD5 value of the screen locking ransomware Trojan, the task is determined as an executive process of the screen locking ransomware Trojan, and profile information of the task is determined as the identifier information of the screen locking ransomware Trojan.

In another embodiment, in addition to determining the executive process of the screen locking ransomware Trojan and obtaining the identifier information of the screen locking ransomware Trojan in the two manners shown in FIG. 8, the same effect can be achieved according to MD5 values in this embodiment. The electronic terminal may collect MD5 values of various types of screen locking ransomware Trojan in advance, and store the MD5 values. That is, the electronic terminal stores an anti-virus database, and MD5 values of various types of screen locking ransomware Trojans are stored in the anti-virus database. In this way, after the electronic terminal is attacked by a screen locking ransomware Trojan, the electronic terminal can automatically obtain the MD5 value of each task currently in the running state, and compares the MD5 value of each task currently in the running state with the MD5 values of various types of screen locking ransomware Trojans stored in the anti-virus database. If the MD5 value of a task currently in the running state is consistent with the pre-stored MD5 value of a screen locking ransomware Trojan, the task is directly determined as the executive process of the screen locking ransomware Trojan. It should be noted that, the anti-virus database may be stored on the electronic terminal and then the electronic terminal periodically updates the anti-virus database through a cloud server; alternatively, the anti-virus database may be directly stored on the cloud server, and when determining a screen locking ransomware Trojan, the electronic terminal actively queries the cloud server in real time through a network protocol.

Operation 203. Display an auxiliary page on the screen of the electronic terminal in a bring-to-front manner, so that the virus program is switched to run in the background.

In this embodiment, after executive process of the screen locking ransomware Trojan is found, the executive process can be killed by using a killBackgroundProcess method provided by the operating system. Because the killBackgroundProcess method can kill only background processes, the screen locking ransomware Trojan further needs to be switched to run in the background. A specific manner of switching the screen locking ransomware Trojan to run in the background is as follows: the electronic terminal automatically creates an auxiliary page, and displays the auxiliary page on the screen of the electronic terminal in a bring-to-front manner, so that the executive process of the screen locking ransomware Trojan is switched to run in the background. The auxiliary page may be page with empty content, or a page with some specific content, which is not limited in this embodiment. It should be noted that, the electronic terminal may further reserve the created auxiliary page, and next time the electronic terminal is attacked by the screen locking ransomware Trojan, the auxiliary page can be directly displayed at the front of the screen of the electronic terminal, and does not need to be created in real time. Further, the auxiliary page may be any page that can be displayed at the front of the screen by the electronic terminal, and is not limited in this embodiment.

In an example of the task queue generated by the get-RunningTasks method in operation 202, after the auxiliary page is displayed at the front of the screen of the electronic terminal, the task queue is updated to be the following task queue:

```
tencent.input.InputMethodSetting.helpActivity
com.sx.zz.MainActivity
com.lenovo.launcher.Launcher
com.android.settings.SubSettings
com.lenovo.ideafriend.mms.android.ui.ComposeMessageActivity
``` where tencent.input.InputMethodSetting.helpActivity refers to an input method process for creating the auxiliary page.

Operation 204. Clean up the virus program according to the identifier information of the virus program.

In this embodiment, the electronic terminal cleans up the screen locking ransomware Trojan by invoking two system interfaces. The two system interfaces include a background process termination interface and an application program uninstallation interface. With reference to FIG. 8, in operation 805, the screen locking ransomware Trojan is cleaned up according to the identifier information of the screen locking ransomware Trojan to unlock the electronic terminal. The cleanup of the screen locking ransomware Trojan according to the identifier information of the screen locking ransomware Trojan may be implemented in the following manner:

First, the background process termination interface in the two system interfaces is invoked, and a termination operation is performed on the executive process of the screen locking ransomware Trojan based on the identifier information of the screen locking ransomware Trojan. The background process termination interface refers to the killBackgroundProcess method mentioned above. This operation is used to kill the executive process of the screen locking ransomware Trojan. After the executive process is killed, theoretically, the terminal locked page of the screen locking ransomware Trojan also disappears in this case, and the victim user can unlock the electronic terminal in a normal unlocking manner, and use the electronic terminal normally.

In some embodiments, to thoroughly remove the screen locking ransomware Trojan from the electronic terminal, the method further includes an operation of uninstalling the screen locking ransomware Trojan, as shown in 806 in FIG. 8. That is, the electronic terminal invokes the application program uninstallation interface in the two system interfaces, and starts an uninstallation operation for the screen locking ransomware Trojan based on previously obtained identifier information of the screen locking ransomware Trojan.

In this case, an uninstallation page of the screen locking ransomware Trojan may further be displayed on the screen of the electronic terminal based on the identifier information of the screen locking ransomware Trojan. While the screen locking Trojan is uninstalled, uninstallation progress of the screen locking ransomware Trojan may be displayed in real time on the uninstallation page. For example, a current uninstallation percentage of the screen locking ransomware Trojan is displayed.

In another embodiment, in addition to direct uninstalling of the screen locking ransomware Trojan, it is also possible to perform an uninstallation operation on the screen locking ransomware Trojan based on a confirm operation of the victim user. In this case, an uninstallation confirm button is generally displayed on the uninstallation page, to prompt the victim user to uninstall the screen locking ransomware Trojan. If the victim user clicks the uninstallation confirm button, the electronic terminal determines that a third operation instruction for the uninstallation confirm button is received, and synchronously performs an uninstallation operation on the screen locking ransomware Trojan in response to the third operation instruction, thereby thoroughly cleaning up the screen locking ransomware Trojan.

Figure 3B:
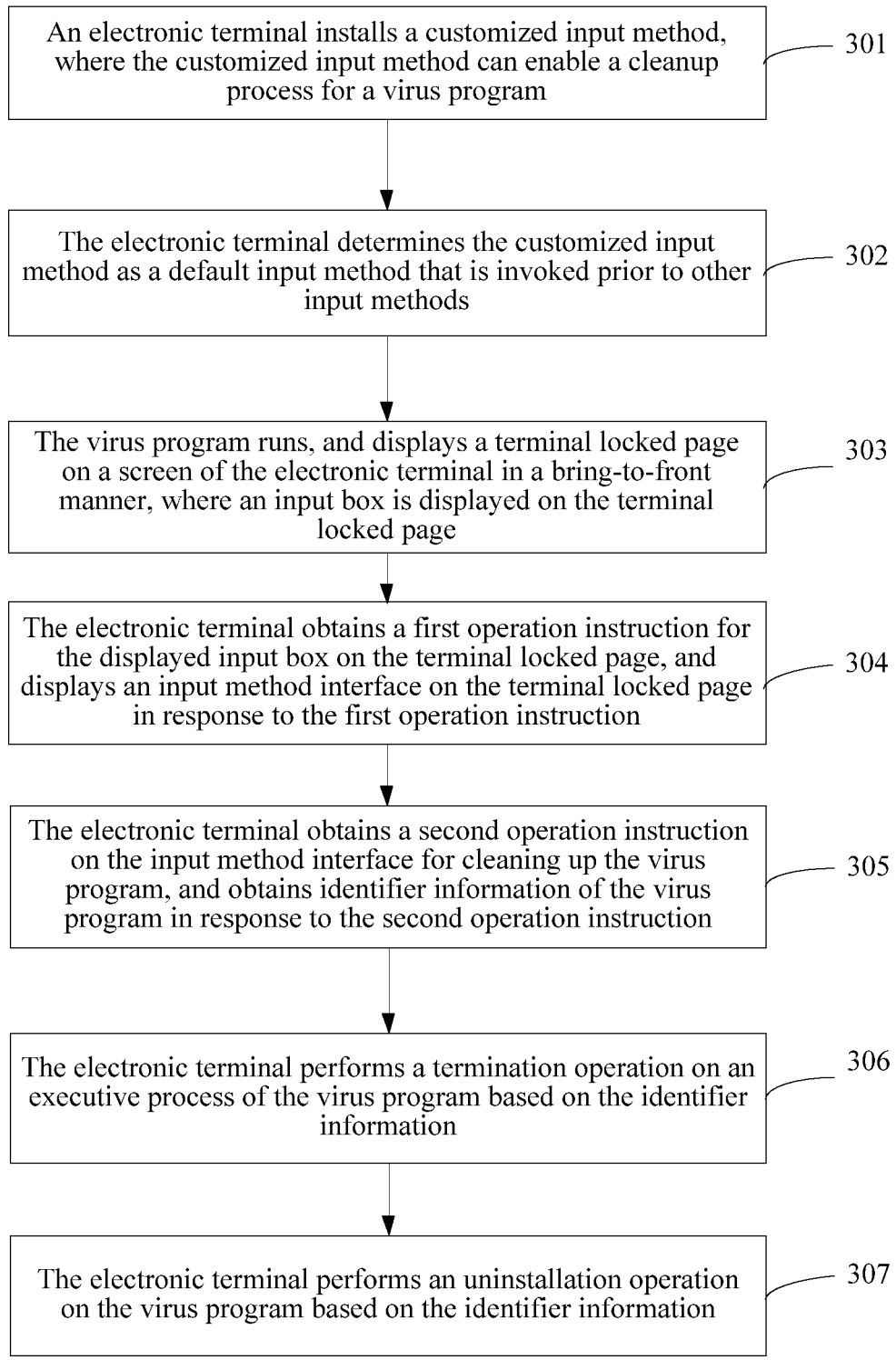
FIG. 3b is an overall flowchart related to a virus program cleanup method according to an embodiment.

In conclusion, referring back to FIG. 3a, the virus program cleanup process provided in this embodiment can be summarized as the following operations 301-307 as shown in FIG. 3b:

Operation 301. An electronic terminal installs a customized input method, where the customized input method can enable a cleanup process for a virus program.

Operation 302. The electronic terminal determines the customized input method as a default input method that is invoked prior to other input methods.

Operation 303. The virus program runs, and displays a terminal locked page on a screen of the electronic terminal in a bring-to-front manner, where an input box is displayed on the terminal locked page.

Operation 304. The electronic terminal obtains a first operation instruction for the displayed input box on the terminal locked page, and displays an input method interface on the terminal locked page in response to the first operation instruction.

In this embodiment, a virus program cleanup starting mechanism is established based on the input method interface. A virus program cleanup process may be started by using the methods described above, and is not limited to being stated by clicking the "one-touch killing" button as shown in FIG. 5. Refer to the foregoing description for details, and details are not described herein again.

Operation 305. The electronic terminal obtains a second operation instruction on the input method interface for cleaning up the virus program, and obtains identifier information of the virus program in response to the second operation instruction.

Operation 306. The electronic terminal performs a termination operation on an executive process of the virus program based on the identifier information.

Operation 307. The electronic terminal performs an uninstallation operation on the virus program based on the identifier information.

In the method provided in this embodiment, a related response mechanism that can start a cleanup process for a screen locking ransomware Trojan is preset on an input method interface. Therefore, after an electronic terminal obtains a first operation instruction for an input box displayed on a terminal locked page, the input method interface is displayed on the terminal locked page. Further, after obtaining an operation on the input method interface for instructing to clean up the screen locking ransomware Trojan, the electronic terminal immediately responds to the operation, so as to start an operation process of cleaning up the screen locking ransomware Trojan. In the virus program cleanup method provided in this embodiment, it is unnecessary to clean up user data stored on the electronic terminal, and there is no obstacle in implementation provided that a corresponding input method is installed on the electronic terminal. Therefore, the virus program cleanup method according to example embodiments is applicable in a wide range and universal, and may clean up a virus program such as the screen locking ransomware Trojan more quickly and conveniently, thereby improving processing performance of a processor of the electronic terminal. The method can assist in unlocking the electronic terminal immediately after the electronic terminal is attacked by the screen locking ransomware Trojan, with improved effect.

Figure 9:
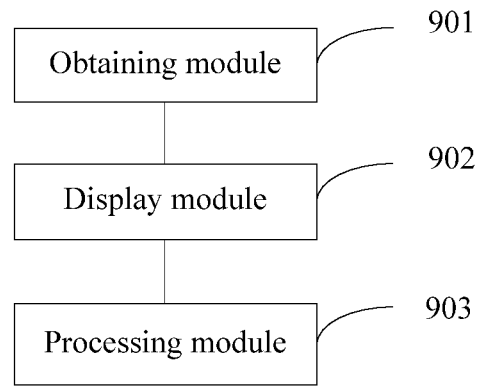
FIG. 9 is a schematic structural diagram of a virus program cleanup apparatus according to an embodiment.

FIG. 9 is a schematic structural diagram of a virus program cleanup apparatus according to an embodiment. Referring to FIG. 9, the apparatus includes:

an obtaining module 901, configured to obtain a first operation instruction for a displayed input box on a terminal locked page of an electronic terminal;

a display module 902, configured to display an operable interface on the terminal locked page in response to the first operation instruction, the terminal locked page being a page of a virus program and being displayed on a screen of the electronic terminal in a bring-to-front manner;

the obtaining module 901 being further configured to obtain a second operation instruction on the operable interface for cleaning up the virus program, and obtain identifier information of the virus program in response to the second operation instruction;

the display module 902 being further configured to display an auxiliary page on the screen of the electronic terminal in a bring-to-front manner, so that the virus program is switched to run in the background; and a processing module 903, configured to clean up the virus program according to the identifier information.

In another embodiment, the obtaining module 901 is configured to invoke, if a version number of a currently installed operating system of the electronic terminal is less than a preset version number, a specified system interface provided by the operating system to obtain tasks currently in a running state, so as to obtain a task queue; and determine a top-ranking task in the task queue as an executive process of the virus program, and determine profile information of the top-ranking task as the identifier information of the virus program.

The specified system interface is used for obtaining tasks currently in a running state.

In another embodiment, the obtaining module 901 is configured to obtain, if a version number of a currently installed operating system of the electronic terminal is greater than a preset version number, at least one state variable value and at least one importance variable value stored by a specified method class provided by the operating system; and determine, if a state variable value of a task currently in a running state is a first numerical value and an importance variable value of the task is a second numerical value, the task as an executive process of the virus program, and determine profile information of the task as the identifier information of the virus program.

The specified method class is used for storing one state variable value and one importance variable value for each task in the running state, the state variable value is used for describing a state of the task, and the importance variable value is used for describing an importance level of the task.

In another embodiment, the obtaining module 901 is configured to obtain an MD5 value of each task currently in a running state if a version number of a currently installed operating system of the electronic terminal is greater than a preset version number; compare the MD5 value of each task currently in the running state with a pre-stored MD5 value of the virus program; and, if an MD5 value of a task currently in the running state is consistent with the MD5 value of the virus program, determine the task as an executive process of the virus program, and determine profile information of the task as the identifier information of the virus program.

In another embodiment, the processing module 903 is configured to invoke a background process termination interface, and perform a termination operation on the executive process of the virus program based on the identifier information; and invoke an application program uninstallation interface, and perform an uninstallation operation on the virus program based on the identifier information.

In another embodiment, the display module 902 is further configured to display, based on the identifier information of the virus program, an uninstallation page of the virus program on the screen of the electronic terminal;

the processing module 903 is configured to obtain a third operation instruction for a displayed uninstallation confirm button on the uninstallation page, and perform the uninstallation operation on the virus program in response to the third operation instruction; and the display module 902 is further configured to display uninstallation progress of the virus program on the uninstallation page.

In another embodiment, the obtaining module 901 is configured to obtain the second operation instruction for a displayed virus cleanup button on the operable interface; or display, on the operable interface, first prompt information for shaking the electronic terminal, and generate the second operation instruction after obtaining a terminal shaking operation; or display, on the operable interface, second prompt information for inputting a particular gesture pattern, and generate the second operation instruction after determining that a gesture pattern currently input on the operable interface matches the particular gesture pattern.

In the apparatus provided in this embodiment, a related response mechanism that can start a cleanup process for a virus program is preset on an operable interface. Therefore, after an electronic terminal, such as a mobile terminal, obtains a first operation instruction for an input box displayed on a terminal locked page, the operable interface is displayed on the terminal locked page. Further, after obtaining an operation instructing on the operable interface for cleaning up the virus program, the mobile terminal immediately responds to the operation, so as to start an operation process of cleaning up the virus program. In the virus program cleanup apparatus provided in this embodiment, it is unnecessary to clean up user data stored on the mobile terminal, and there is no obstacle in implementation provided that a corresponding input method is installed on the mobile terminal. Therefore, the virus program cleanup method according to example embodiments is applicable in a wide range and universal, and may clean up a virus program such as the screen locking ransomware Trojan more quickly and conveniently, thereby improving processing performance of a processor of the mobile terminal. The method can assist in unlocking the mobile terminal immediately after the mobile terminal is attacked by the virus program, with improved effect.

It should be noted that, when the virus program cleanup apparatus provided in the foregoing embodiment cleans up a virus program, the division of the foregoing functional modules is merely used as an example for description. In practical application, the foregoing functions may also be assigned to and completed by different functional modules as required. That is, the internal structure of the apparatus is divided into different functional modules to complete all or some of the functions described above. In addition, the virus program cleanup apparatus provided in the foregoing embodiment belongs to the same conception as the foregoing embodiment of the virus program cleanup method. Refer to the method embodiment for a specific implementation process. Details are not described herein again.

An embodiment provides a storage device (e.g., computer-readable storage medium device). The storage device stores a plurality of machine readable instructions that can be loaded and executed by a processor.

The processor may execute instructions of the foregoing operations such as displaying a terminal locked page including an input box, displaying an operable interface based on an operation instruction for the input box, further obtaining an instruction on the operable interface for cleaning up a virus program, obtaining identifier information of the virus program and switching the virus program to run in the background, thereby cleaning up the virus program according to the identifier information of the virus program, so as to implement the functions of the obtaining module 901, the display module 902, and the processing module 903 in the foregoing embodiment of the virtual apparatus.

In the storage device provided in this embodiment, a related response mechanism that can start a cleanup process for a screen locking ransomware Trojan is preset on an operable interface. Therefore, after an electronic terminal, such as a mobile terminal, obtains a first operation instruction for an input box displayed on a terminal locked page, the operable interface is displayed on the terminal locked page. Further, after obtaining an operation on the operable interface for instructing to clean up the virus program, the mobile terminal immediately responds to the operation, so as to start an operation process of cleaning up the virus program. In the storage device provided in this embodiment, it is unnecessary to clean up user data stored on the mobile terminal, and there is no obstacle in implementation provided that a corresponding input method is installed on the mobile terminal. Therefore, the virus program cleanup method according to example embodiments is applicable in a wide range and universal, and may clean up a virus program such as the screen locking ransomware Trojan more quickly and conveniently, thereby improving processing performance of a processor of the mobile terminal. The method can assist in unlocking the mobile terminal immediately after the mobile terminal is attacked by the virus program, with improved effect.

An embodiment provides an electronic terminal, including: a processor and a storage device connected to the processor. The storage device stores a plurality of machine readable instructions that can be loaded and executed by the processor.

The processor may execute instructions of the foregoing operations such as displaying a terminal locked page including an input box, displaying an operable interface based on an operation instruction for the input box, further obtaining an instruction on the operable interface for cleaning up a virus program, obtaining identifier information of the virus program and switching the virus program to run in the background, thereby cleaning up the virus program according to the identifier information of the virus program, so as to implement the functions of the obtaining module 901, the display module 902, and the processing module 903 in the foregoing embodiment of the virtual apparatus.

In the electronic device (such as an electronic terminal) provided in this embodiment, a related response mechanism that can start a cleanup process for a screen locking ransomware Trojan is preset on an operable interface. Therefore, after the electronic terminal obtains a first operation instruction for an input box displayed on a terminal locked page, the operable interface is displayed on the terminal locked page. Further, after obtaining an operation on the operable interface for instructing to clean up the virus program, the electronic terminal immediately responds to the operation, so as to start an operation process of cleaning up the virus program. In the electronic terminal provided in this embodiment, it is unnecessary to clean up user data stored on the electronic terminal, and there is no obstacle in implementation provided that a corresponding input method is installed on the electronic terminal. Therefore, the virus program cleanup method according to example embodiments is applicable in a wide range and universal, and may clean up a virus program such as the screen locking ransomware Trojan more quickly and conveniently, thereby improving processing performance of a processor of the electronic terminal. The method can assist in unlocking the electronic terminal immediately after the electronic terminal is attacked by the virus program, with improved effect.

Figure 10:
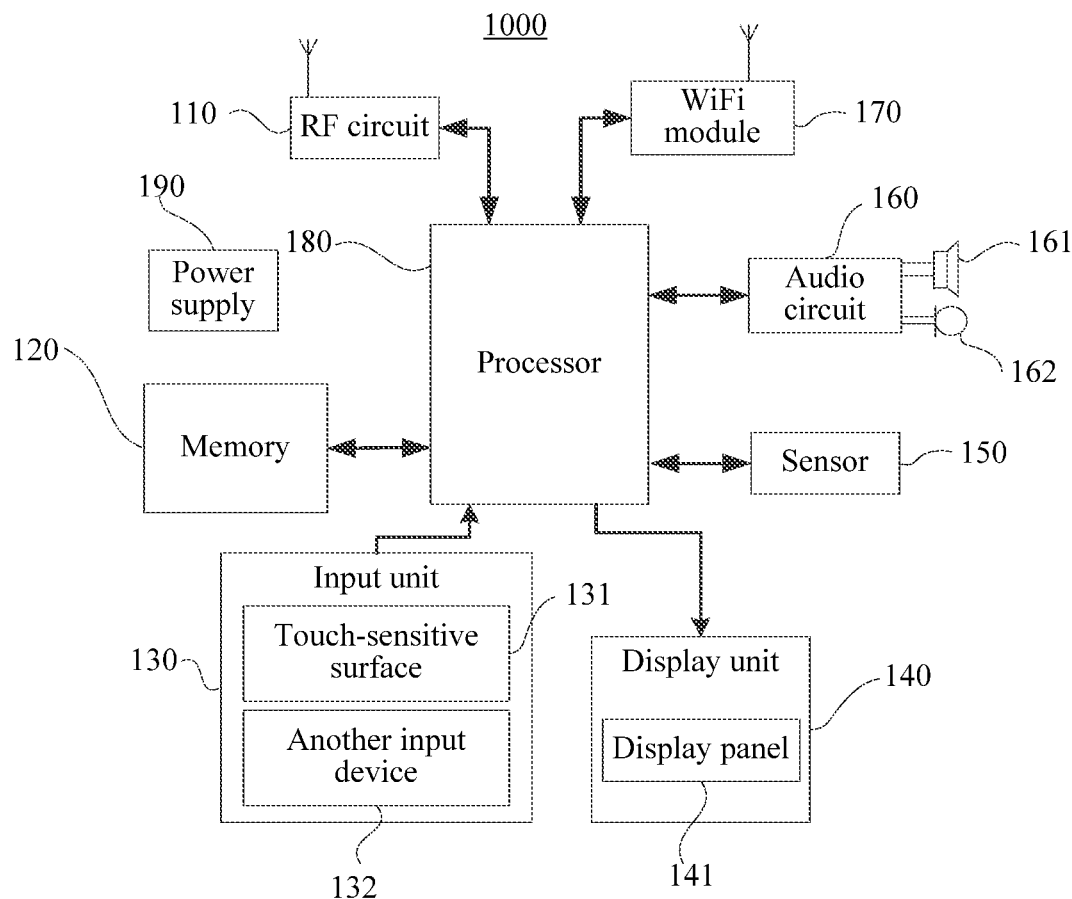
FIG. 10 is a schematic structural diagram of an electronic terminal according to an embodiment.

FIG. 10 is a schematic structural diagram of an electronic terminal according to an embodiment. The electronic terminal may be configured to perform the virus program cleanup method provided in the foregoing embodiment. Referring to FIG. 10, the terminal 1000 includes:

components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 110 may be configured to receive and send a signal during an information receiving and sending process or a conversation process. The RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a machine readable instruction and module. The processor 180 runs the machine readable instruction and module stored in the memory 120, to implement various functional applications and data processing. In this embodiment, the memory 120 stores machine readable instructions, and the processor 180 can execute the machine readable instructions stored in the memory 120 to implement the functions of the foregoing obtaining module 901, display module 902, and processing module 903. Refer to the method embodiment for a specific implementation process. Details are not described herein again. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1000, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1000. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides a corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 1000 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1000 is moved to the ear. As one type of motion sensor, a gravity acceleration sensor may detect magnitude of accelerations at various directions (generally including three axes), may detect magnitude and a direction of the gravity when static, and may be configured to identify an application of a mobile phone attitude (such as switchover between horizontal and vertical screens, a related game, and attitude calibration of a magnetometer), a function related to vibration identification (such as a pedometer and a knock). Other sensors, such as a gyroscope, a barometer, a hygrometer, a thermometer, and an infrared sensor, which may be configured in the terminal 1000 are not further described herein.

The audio circuit 160, a loudspeaker 161, and a microphone 162 may provide audio interfaces between the user and the terminal 1000. The audio circuit 160 may transmit, to the loudspeaker 161, a received electric signal converted from received audio data. The loudspeaker 161 converts the electric signal into a sound signal to be output. On the other hand, the microphone 162 converts a collected sound signal into an electric signal. The audio circuit 160 receives the electric signal and converts the electric signal into audio data, and outputs the audio data to the processor 180 to be processed. Then, the processor 180 sends the audio data to, for example, another terminal by using the RF circuit 110, or outputs the audio data to the memory 120. The audio circuit 160 may further include an earplug jack, so as to provide communication between a peripheral earphone and the terminal 1000.

WiFi is a short distance wireless transmission technology. The terminal 1000 may be used, by using the WiFi module 170, to allow a user to receive and send an e-mail, browse a webpage, and access stream media, and the like, which provides wireless broadband Internet access for the user.

The processor 180 is a control center of the terminal 1000, and connects various parts of the electronic terminal by using various interfaces and lines. By running or executing the machine readable instruction and/or module stored in the memory 120, and invoking data stored in the memory 120, the processor 180 performs various functions and data processing of the terminal 1000, thereby performing overall monitoring on the electronic terminal. In some embodiments, the processor 180 may include one or more processing cores. The processor 180 may integrate an application processor and a modem processor. The application processor mainly processes an operating system, a user interface, an application program, and the like. The modem processor mainly processes wireless communication. It may be understood that, the foregoing modem processor may not be integrated into the processor 180.

The terminal 1000 further includes the power supply 190 (such as a battery) for supplying power to the components. In some embodiments, the power supply may be logically connected to the processor 180 by using a power supply management system, thereby implementing functions, such as charging, discharging, and power consumption management, by using the power supply management system. The power supply 190 may further include any component, such as one or more direct current or alternating current power supplies, a re-charging system, a power supply fault detection circuit, a power supply converter or an inverter, and a power supply state indicator.

Although not shown in the figure, the terminal 1000 may further include a camera, a Bluetooth module, and the like, which are not further described herein. For example, in this embodiment, the display unit of the electronic terminal is a touch screen display, and the terminal further includes a memory and one or more programs. The one or more programs are stored in the memory and configured to be executed by one or more processors. The one or more programs contain instructions for implementing the foregoing virus program cleanup method.

A person of ordinary skill in the art can understand that, all or some of operations for implementing the foregoing embodiment may be completed by hardware, or by a program instructing relevant hardware. The program may be stored in a non-volatile computer readable storage medium, and the aforementioned storage medium may be a read-only memory, a magnetic disk, an optical disc, or the like. Any reference to a memory, a storage, a database or another medium used in the various embodiments may include a non-volatile and/or a volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory bus (Rambus) direct RAM (RDRAM), a direct memory bus dynamic RAM (DRDRAM), and a memory bus dynamic RAM (RDRAM).

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method of cleaning up a virus program, in an electronic terminal comprising at least one processor, the method comprising:

obtaining, by at least one of the at least one processor, a first operation instruction for an input field included in a terminal locked page of the electronic terminal, and displaying an operable interface on the terminal locked page in response to the first operation instruction, the terminal locked page being a page of the virus program and displayed on a screen of the electronic terminal in a bring-to-front manner, and the operable interface comprising an item for cleaning up the virus program;

obtaining, by at least one of the at least one processor, a second operation instruction with respect to the item for cleaning up the virus program on the operable interface, and obtaining identifier information of the virus program in response to the second operation instruction;

displaying, by at least one of the at least one processor, an auxiliary page on the screen of the electronic terminal in the bring-to-front manner, so that the virus program is switched to run in the background; and cleaning up, by at least one of the at least one processor, the virus program based on the identifier information, wherein the obtaining the identifier information comprises:

obtaining, from a specified method class provided by an operating system, one state variable value and one importance variable value for each task in a running state, a state variable value of a task indicating a state of the task, and an importance variable value of the task indicating an importance level of the task; and determining a first task as an executive process of the virus program based on a state variable value and an importance variable value of the first task, and determining profile information of the first task as the identifier information of the virus program.

2. The method according to claim 1, wherein the obtaining the identifier information comprises:

invoking, in response to a version number of the operating system, currently installed, of the electronic terminal being less than a preset version number, a specified system interface provided by the operating system to obtain a task queue based on tasks currently in a running state; and determining a top-ranking task in the task queue as the executive process of the virus program, and determining profile information of the top-ranking task as the identifier information of the virus program.

3. The method according to claim 1, wherein the obtaining the one state variable value and the one importance variable value is performed based on a version number of the operating system, currently installed, of the electronic terminal being greater than a preset version number, and wherein the determining the first task as the executive process of the virus program based on the state variable value of the first task being a first numerical value and the importance variable value of the first task being a second numerical value.

4. The method according to claim 1, wherein the obtaining the identifier information comprises:
   obtaining a Message Digest Algorithm 5 (MD5) value of each task currently in a running state in response to a version number of the operating system, currently installed, of the electronic terminal being greater than a preset version number;
   comparing the MD5 value of each task currently in the running state with a pre-stored MD5 value of the virus program; and
   determining, in response to an MD5 value of a second task currently in the running state being consistent with the pre-stored MD5 value of the virus program, the second task as the executive process of the virus program, and determining profile information of the second task as the identifier information of the virus program.

5. The method according to claim 1, wherein the cleaning up comprises:
   invoking a background process termination interface, and performing a termination operation on the executive process of the virus program based on the identifier information; and
   invoking an application program uninstallation interface, and performing an uninstallation operation on the virus program based on the identifier information.

6. The method according to claim 5, wherein the performing the uninstallation operation comprises:
   displaying, based on the identifier information, an uninstallation page of the virus program on the screen of the electronic terminal; and
   obtaining a third operation instruction for a displayed uninstallation confirm button on the uninstallation page, performing the uninstallation operation on the virus program in response to the third operation instruction, and displaying uninstallation progress of the virus program on the uninstallation page.

7. The method according to claim 1, wherein the obtaining the second operation instruction comprises:
   obtaining the second operation instruction for a displayed virus cleanup button on the operable interface; or
   displaying, on the operable interface, first prompt information instructing to shake the electronic terminal, and generating the second operation instruction based on shaking of the electronic terminal; or
   displaying, on the operable interface, second prompt information instructing to enter a particular gesture pattern, and generating the second operation instruction based on a gesture pattern entered on the operable interface matching the particular gesture pattern.

8. A non-transitory computer readable storage medium, storing machine readable instructions executable by at least one processor to perform:
   obtaining a first operation instruction for an input field included in a terminal locked page of an electronic terminal, and displaying an operable interface on the terminal locked page in response to the first operation instruction, the terminal locked page being a page of a virus program and displayed on a screen of the electronic terminal in a bring-to-front manner, and the operable interface comprising an item for cleaning up the virus program;
   obtaining a second operation instruction with respect to the item for cleaning up the virus program on the operable interface, and obtaining identifier information of the virus program in response to the second operation instruction;
   displaying an auxiliary page on the screen of the electronic terminal in the bring-to-front manner, so that the virus program is switched to run in the background; and cleaning up the virus program based on the identifier information,
   wherein the obtaining the identifier information comprises:
   obtaining, from a specified method class provided by an operating system, one state variable value and one importance variable value for each task in a running state, a state variable value of a task indicating a state of the task, and an importance variable value of the task indicating an importance level of the task; and
   determining a first task as an executive process of the virus program based on a state variable value and an importance variable value of the first task, and determining profile information of the first task as the identifier information of the virus program.

9. The non-transitory computer readable storage medium according to claim 8, wherein the obtaining the identifier information comprises:
   invoking, in response to a version number of the operating system, currently installed, of the electronic terminal being less than a preset version number, a specified system interface provided by the operating system to obtain a task queue based on tasks currently in a running state; and
   determining a top-ranking task in the task queue as the executive process of the virus program, and determining profile information of the top-ranking task as the identifier information of the virus program.

10. The non-transitory computer readable storage medium according to claim 8, wherein the obtaining the one state variable value and the one importance variable value is performed based on a version number of the operating system, currently installed, of the electronic terminal being greater than a preset version number, and
   wherein the determining the first task as the executive process of the virus program based on the state variable value of the first task being a first numerical value and the importance variable value of the first task being a second numerical value.

11. The non-transitory computer readable storage medium according to claim 8, wherein the obtaining the identifier information comprises:
   obtaining a Message Digest Algorithm 5 (MD5) value of each task currently in a running state in response to a version number of the operating system, currently installed, of the electronic terminal being greater than a preset version number;
   comparing the MD5 value of each task currently in the running state with a pre-stored MD5 value of the virus program; and
   determining, in response to an MD5 value of a second task currently in the running state being consistent with the pre-stored MD5 value of the virus program, the second task as the executive process of the virus program, and determining profile information of the second task as the identifier information of the virus program.

12. The non-transitory computer readable storage medium according to claim 8, wherein the cleaning up comprises:

invoking a background process termination interface, and performing a termination operation on the executive process of the virus program based on the identifier information; and invoking an application program uninstallation interface, and performing an uninstallation operation on the virus program based on the identifier information.

13. The non-transitory computer readable storage medium according to claim 12, wherein the performing the uninstallation operation comprises:

displaying, based on the identifier information, an uninstallation page of the virus program on the screen of the electronic terminal; and obtaining a third operation instruction on the uninstallation page, performing the uninstallation operation on the virus program in response to the third operation instruction, and displaying uninstallation progress of the virus program on the uninstallation page.

14. The non-transitory computer readable storage medium according to claim 8, wherein the obtaining the second operation instruction comprises:

obtaining the second operation instruction for a displayed virus cleanup button on the operable interface; or displaying, on the operable interface, first prompt information instructing to shake the electronic terminal, and generating the second operation instruction based on shaking of the electronic terminal; or displaying, on the operable interface, second prompt information instructing to enter a particular gesture pattern, and generating the second operation instruction based on a gesture pattern entered on the operable interface matching the particular gesture pattern.

15. An electronic terminal, comprising:

at least one memory operable to store program code; and at least one processor operable to read the program code and operate as instructed by the program code, the program code comprising:

first obtaining code configured to cause at least one of the at least one processor to obtain a first operation instruction for an input field included in a terminal locked page of the electronic terminal, and display an operable interface on the terminal locked page in response to the first operation instruction, the terminal locked page being a page of a virus program and displayed on a screen of the electronic terminal in a bring-to-front manner, and the operable interface comprising an item for cleaning up the virus program;

second obtaining code configured to cause at least one of the at least one processor to obtain a second operation instruction with respect to the item for cleaning up the virus program on the operable interface, and obtain identifier information of the virus program in response to the second operation instruction;

displaying code configured to cause at least one of the at least one processor to display an auxiliary page on the screen of the electronic terminal in the bring-to-front manner, so that the virus program is switched to run in the background; and cleaning code configured to cause at least one of the at least one processor to clean up the virus program based on the identifier information, wherein the second obtaining code comprises:

third obtaining code configured to cause at least one of the at least one processor to obtain, from a specified method class provided by an operating system, one state variable value and one importance variable value for each task in a running state, a state variable value of a task indicating a state of the task, and an importance variable value of the task indicating an importance level of the task; and first determining code configured to cause at least one of the at least one processor to determine a first task as an executive process of the virus program based on a state variable value and an importance variable value of the first task, and determine profile information of the first task as the identifier information of the virus program.

16. The electronic terminal according to claim 15, wherein the second obtaining code further comprises:

invoking code configured to cause at least one of the at least one processor to, in response to a version number of the operating system, currently installed, of the electronic terminal being less than a preset version number, invoke a specified system interface provided by the operating system to obtain a task queue based on tasks currently in a running state; and second determining code configured to cause at least one of the at least one processor to determine a top-ranking task in the task queue as the executive process of the virus program, and determine profile information of the top-ranking task as the identifier information of the virus program.

17. The electronic terminal according to claim 15, wherein the third obtaining code is configured to cause at least one of the at least one processor to obtain the one state variable value and the one importance variable value is performed based on a version number of the operating system, currently installed, of the electronic terminal being greater than a preset version number; and wherein the first determining code is configured to cause at least one of the at least one processor to determine the first task as the executive process of the virus program based on the state variable value of the first task being a first numerical value and the importance variable value of the first task being a second numerical value.

18. The electronic terminal according to claim 15, wherein the second obtaining code further comprises:

fourth obtaining code configured to cause at least one of the at least one processor to obtain a Message Digest Algorithm 5 (MD5) value of each task currently in a running state in response to a version number of the operating system, currently installed, of the electronic terminal being greater than a preset version number;

comparing code configured to cause at least one of the at least one processor to compare the MD5 value of each task currently in the running state with a pre-stored MD5 value of the virus program; and third determining code configured to cause at least one of the at least one processor to, in response to an MD5 value of a second task currently in the running state being consistent with the pre-stored MD5 value of the virus program, determine the second task as the executive process of the virus program, and determine profile information of the second task as the identifier information of the virus program.

19. The electronic terminal according to claim 15, wherein the cleaning code comprises:

first invoking code configured to cause at least one of the at least one processor to invoke a background process termination interface, and perform a termination operation on the executive process of the virus program based on the identifier information; and second invoking code configured to cause at least one of the at least one processor to invoke an application program uninstallation interface, and perform an uninstallation operation on the virus program based on the identifier information.

20. The electronic terminal according to claim 19, wherein the second invoking code comprises:

second displaying code configured to cause at least one of the at least one processor to, based on the identifier information, display an uninstallation page of the virus program on the screen of the electronic terminal; and fourth obtaining code configured to cause at least one of the at least one processor to obtain a third operation instruction for a displayed uninstallation confirm button on the uninstallation page, perform the uninstallation operation on the virus program in response to the third operation instruction, and display uninstallation progress of the virus program on the uninstallation page.

\* \* \* \* \*